(12) United States Patent
Kuroiwa et al.

(10) Patent No.: US 12,428,140 B2
(45) Date of Patent: Sep. 30, 2025

(54) UNMANNED AERIAL VEHICLE, AND METHOD FOR USING SAME

(71) Applicants: ACSL Ltd., Tokyo (JP); NJS Co., Ltd., Tokyo (JP)

(72) Inventors: Kenji Kuroiwa, Chiba (JP); Yusuke Inagaki, Suita (JP); Kohei Yamasaki, Funabashi (JP); Akikazu Onishi, Kawasaki (JP); Satoshi Katsuoka, Shinjuku (JP); Yukinori Masuya, Sagamihara (JP); Ichiro Okada, Soka (JP)

(73) Assignees: ACSL Ltd., Tokyo (JP); NJS Co., Ltd., Tokyo (JP)

( * ) Notice: Subject to any disclaimer, the term of this patent is extended or adjusted under 35 U.S.C. 154(b) by 283 days.

(21) Appl. No.: 16/603,034

(22) PCT Filed: Mar. 28, 2018

(86) PCT No.: PCT/JP2018/012739
§ 371 (c)(1),
(2) Date: Oct. 4, 2019

(87) PCT Pub. No.: WO2018/186256
PCT Pub. Date: Oct. 11, 2018

(65) Prior Publication Data
US 2020/0055598 A1      Feb. 20, 2020

(30) Foreign Application Priority Data

Apr. 6, 2017  (JP) ................................ 2017-076237

(51) Int. Cl.
*B64C 27/20*   (2023.01)
*B64U 50/14*   (2023.01)
(Continued)

(52) U.S. Cl.
CPC .............. *B64C 27/20* (2013.01); *B64U 50/14* (2023.01); *G05D 1/101* (2013.01); *B64U 30/26* (2023.01);
(Continued)

(58) Field of Classification Search
CPC . B64C 39/024; B64C 27/20; B64C 2201/027; B64C 2201/042;
(Continued)

(56) References Cited

U.S. PATENT DOCUMENTS 10,086,309 B2 * 10/2018 Yamada ................ B64C 39/024
10,086,937 B2 * 10/2018 Matsue ................ G05D 1/0094
(Continued)

FOREIGN PATENT DOCUMENTS

| CN | 103419942 A | 12/2013 |
| CN | 103712035 A | 4/2014 |

(Continued)

OTHER PUBLICATIONS

PCT International Search Report, PCT International Application No. PCT/JP2018/012739, dated Jun. 12, 2018, 2 pages.

*Primary Examiner* — Benjamin P Lee
(74) *Attorney, Agent, or Firm* — McDonnell Boehnen Hulbert & Berghoff LLP

(57) ABSTRACT

The purpose of the present invention is to provide a highly efficient method for capturing images inside a confined space without the need for direct visual observation by an inspector. Provided is an unmanned aerial vehicle equipped with at least four rotors, a drive device that drives the rotors, a control signal generation circuit that generates a control signal for causing the drive device to drive the rotors, and an imaging camera, wherein said unmanned aerial vehicle is configured to fly within a confined space by driving the (Continued)

rotors while capturing images inside the confined space by means of the imaging camera.

24 Claims, 10 Drawing Sheets

(51) Int. Cl.
*G05D 1/00* (2006.01)
*B64U 30/26* (2023.01)
*B64U 101/30* (2023.01)

(52) U.S. Cl.
CPC ...... *B64U 2101/30* (2023.01); *B64U 2201/10* (2023.01)

(58) Field of Classification Search
CPC ........ B64C 2201/108; B64C 2201/127; B64C 2201/162
See application file for complete search history.

(56) References Cited

U.S. PATENT DOCUMENTS

| | | | | |
|---|---|---|---|---|
| 10,293,937 | B2* | 5/2019 | Welsh | B64C 39/024 |
| 10,358,213 | B2* | 7/2019 | Freeman | B64C 27/001 |
| 10,358,214 | B2* | 7/2019 | Zhang | B64C 27/08 |
| 10,359,778 | B2* | 7/2019 | Kono | G01C 23/00 |
| 10,719,080 | B2* | 7/2020 | Zhang | B64F 5/60 |
| 10,824,167 | B2* | 11/2020 | Qu | G05D 1/042 |
| 11,021,240 | B2* | 6/2021 | Lee | B64C 39/024 |
| D925,399 | S* | 7/2021 | Zhang | D12/16.1 |
| 11,142,314 | B2* | 10/2021 | Hada | B64C 39/022 |
| 11,498,090 | B2* | 11/2022 | Thompson | B05B 9/047 |
| 2011/0192931 | A1 | 8/2011 | Jung | |
| 2011/0288696 | A1* | 11/2011 | Lefebure | A63H 30/04 |
| | | | | 701/2 |
| 2014/0061376 | A1* | 3/2014 | Fisher | B60K 7/0007 |
| | | | | 244/62 |
| 2014/0099853 | A1* | 4/2014 | Condon | A63F 13/245 |
| | | | | 446/37 |
| 2015/0286216 | A1 | 10/2015 | Miwa | |
| 2015/0377405 | A1* | 12/2015 | Down | B64C 39/024 |
| | | | | 73/865.8 |
| 2016/0068261 | A1 | 3/2016 | Niederberger | |
| 2016/0129998 | A1 | 5/2016 | Welsh et al. | |
| 2016/0137293 | A1* | 5/2016 | Santangelo | B64C 37/00 |
| | | | | 244/50 |
| 2016/0200415 | A1 | 7/2016 | Cooper | |
| 2016/0229530 | A1 | 8/2016 | Welsh | |
| 2016/0286128 | A1 | 9/2016 | Zhou | |
| 2016/0321503 | A1 | 11/2016 | Zhou | |
| 2016/0375983 | A1* | 12/2016 | Yan | A63H 33/005 |
| | | | | 701/4 |
| 2017/0066530 | A1 | 3/2017 | Salzmann | |
| 2017/0139410 | A1* | 5/2017 | Kono | G01C 21/206 |
| 2017/0185084 | A1* | 6/2017 | Wang | G05D 1/0669 |
| 2018/0037317 | A1 | 2/2018 | Ichihara et al. | |
| 2018/0057135 | A1* | 3/2018 | Yan | B64D 47/08 |
| 2018/0059660 | A1* | 3/2018 | Heatzig | G06K 9/00664 |
| 2019/0009877 | A1* | 1/2019 | Toyama | B64C 27/006 |
| 2019/0100296 | A1* | 4/2019 | Aldana | G05D 1/042 |
| 2020/0307783 | A1* | 10/2020 | Lacaze | B64C 39/024 |
| 2020/0307786 | A1* | 10/2020 | Tavakolikhakaledi | B64F 3/00 |
| 2021/0147078 | A1* | 5/2021 | Kuroiwa | B64C 13/20 |
| 2021/0163131 | A1* | 6/2021 | Kuroiwa | B64C 39/024 |
| 2021/0171196 | A1* | 6/2021 | Kuroiwa | B64C 25/34 |

FOREIGN PATENT DOCUMENTS

| | | | | |
|---|---|---|---|---|
| CN | 203544370 U | 4/2014 | | |
| CN | 104199455 A | 12/2014 | | |
| CN | 204193502 U | 3/2015 | | |
| CN | 104627366 A | 5/2015 | | |
| CN | 104755373 A | 7/2015 | | |
| CN | 104843176 A | 8/2015 | | |
| CN | 204956914 U | 1/2016 | | |
| CN | 105366045 A | 3/2016 | | |
| CN | 106628149 A * | 5/2017 | | H04N 7/18 |
| ES | 2 524 383 A1 | 5/2014 | | |
| JP | 2005-349556 A | 6/2004 | | |
| JP | 2005-349556 | 12/2005 | | |
| JP | 2012-505792 | 3/2012 | | |
| JP | 2016-15628 | 1/2016 | | |
| JP | 2016-522113 | 7/2016 | | |
| JP | 2016180866 A | 10/2016 | | |
| JP | 2016218813 A | 12/2016 | | |
| KR | 1020160014266 A | 2/2016 | | |
| KR | 10-2016-0089671 A | 7/2016 | | |
| WO | 2013104691 A1 | 7/2013 | | |
| WO | 2015/177376 A1 | 11/2015 | | |
| WO | 2016/136848 A1 | 4/2017 | | |

* cited by examiner

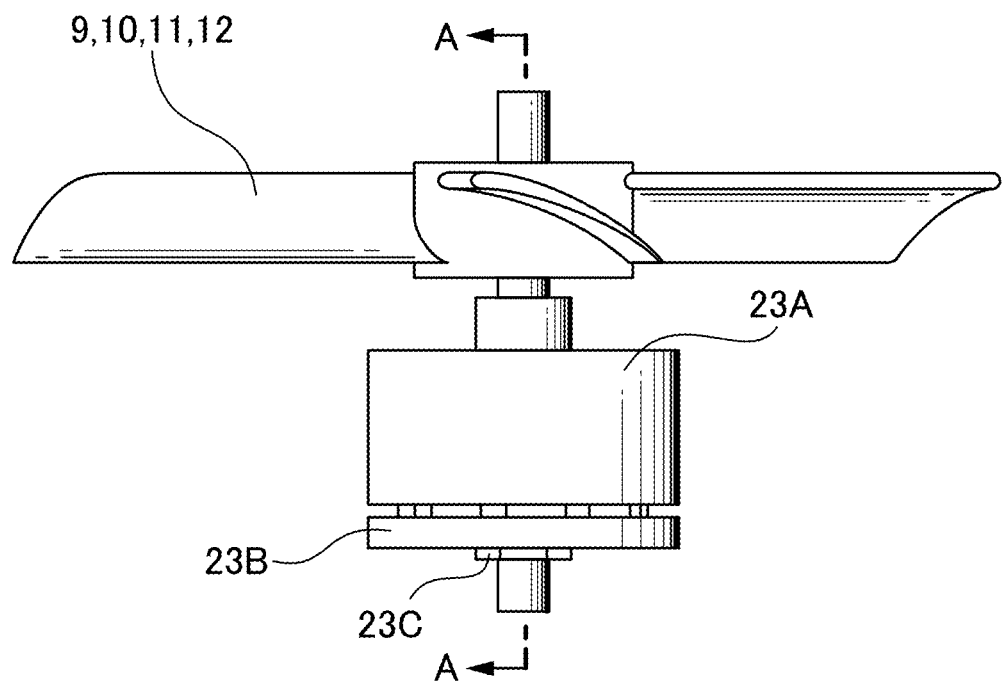

UNMANNED AERIAL VEHICLE, AND METHOD FOR USING SAME

This application is a U.S. national phase application under 35 USC 371 of International Patent Application no. PCT/JP2018/012739, filed Mar. 28, 2018, which claims the benefit of Japanese Application no. 2017-076237, filed Apr. 6, 2017.

TECHNICAL FIELD

The present invention relates to an unmanned aerial vehicle, and a method using this. In particular, the present invention is related to an unmanned aerial vehicle for a flight with taking (capturing) images inside a closed-type space (or a confined space) such as inside a tubular space and inside a rectangular space, and the present invention is related to a method using the unmanned aerial vehicle.

BACKGROUND ART

The durable years (service life) of a sewerage pipe line is deemed to be approximately 50 years, and it is assumed that the number of facilities which will reach the durable years will rapidly increase hereafter. For efficient maintenance and management, it is necessary to comprehend the states of sewerage pipe lines.

Conventionally, as inspection methods of the state of a sewerage pipe line, methods such as a method in which an investigator goes underground into the pipe and inspects directly by visual observation, a method of positioning, inside the pipe, a television camera which is connected to above the ground via a cable and of taking images, and a method of positioning, inside the pipe, a television camera which is connected to above the ground via a cable and which is mounted on a self-propelled car and of taking images while running (travelling), have been used. However, in the method by direct visual observation by an investigator, there are various problems such as a risk of influence on a human body via generation of poisonous gas inside the sewerage pipe line and a risk by inundation when a rainfall rapidly occurs. And, also in the method of positioning a television camera inside the pipe, there are problems such as an sufficient inspection speed being not obtained, and difficulty in controlling the car when the water level inside the sewerage pipe line rises.

SUMMARY OF INVENTION

Problem to be Solved by the Invention

Therefore, the present invention aims to provide a method, which does not require direct visual observation by an investigator and which has good efficiency, of taking images inside a closed-type space (or a confined space) such as a culvert (a waterway provided underground).

Measures to Solve the Problem

In order to solve the above problem (achieve the above aim), the present invention provides an unmanned aerial vehicle having at least four rotary wings (rotors), a drive device that drives the rotary wings, a control signal generation circuit that generates a control signal for causing the drive device to drive the rotary wings, and an imaging camera, wherein the unmanned aerial vehicle is configured to fly inside a closed-type space (confined space) with driving the rotary wings while taking (capturing) images inside the closed-type space by means of the imaging camera.

It is possible to further provide the above unmanned aerial vehicle with a member for preceding impact (collision) which is for causing an impact on a boundary surface in advance when the unmanned aerial vehicle impacts on (collides with) the boundary surface of the closed-type space.

It is possible to further configure the above unmanned aerial vehicle so that, the member for preceding impact is positioned at the side of one edge of the unmanned aerial vehicle and, when the unmanned aerial vehicle impacts on the boundary surface while flying inside the closed-type space with the side of the one edge as the forward side, the member for preceding impact is configured to impact on the boundary surface on the forward side ahead of the position of the center of gravity (centroid) of the unmanned aerial vehicle.

It is possible to further configure the above unmanned aerial vehicle so that the control signal includes an attitude control signal, the attitude control signal causes the drive device to drive the rotary wings, and, when the unmanned aerial vehicle is tilted, the attitude of the unmanned aerial vehicle is controlled by reducing the number of rotations (rotational speed) of one or some of the rotary wings.

It is possible to further configure the above unmanned aerial vehicle so that the drive device includes at least four motors which provide the respective rotary wings with motive powers, respectively, and each of the motors provides the rotary wing with motive power at a position with a higher gravitational potential than the rotary wing which receives motive power from the each motor.

It is possible to further configure the above unmanned aerial vehicle so that it further includes a thrust generation propeller and propels by rotations of the thrust generation propeller while floating by rotations of the at least four rotary wings.

It is possible to further configure the above unmanned aerial vehicle so that it further includes a direction of travel imaging camera and a direction of travel imaging data transmitter, and that the unmanned aerial vehicle flies inside the closed-type space while taking images of the direction of travel inside the closed-type space by means of the direction of travel imaging camera and while transmitting, to the outside, the obtained direction of travel imaging data from the direction of travel imaging data transmitter.

In addition, the present invention provides a method of causing a unmanned aerial vehicle having at least four rotary wings (rotors), a drive device that drives the rotary wings, a control signal generation circuit that generates a control signal for causing the drive device to drive the rotary wings, and an imaging camera, to fly inside a closed-type space (confined space) with driving the rotary wings while taking (capturing) images inside the closed-type space by means of the imaging camera.

Effects of Invention

By the present invention, taking of images inside the closed-type space with higher safety and without necessity of going underground by an investigator, becomes possible. In addition, in comparison to a self-propelled car, the unmanned aerial vehicle does not tend to impair its mobility even in a case where there is water inside the closed-type space, thus more efficient imaging becomes possible.

DESCRIPTION OF EMBODIMENTS

Figure 1A:
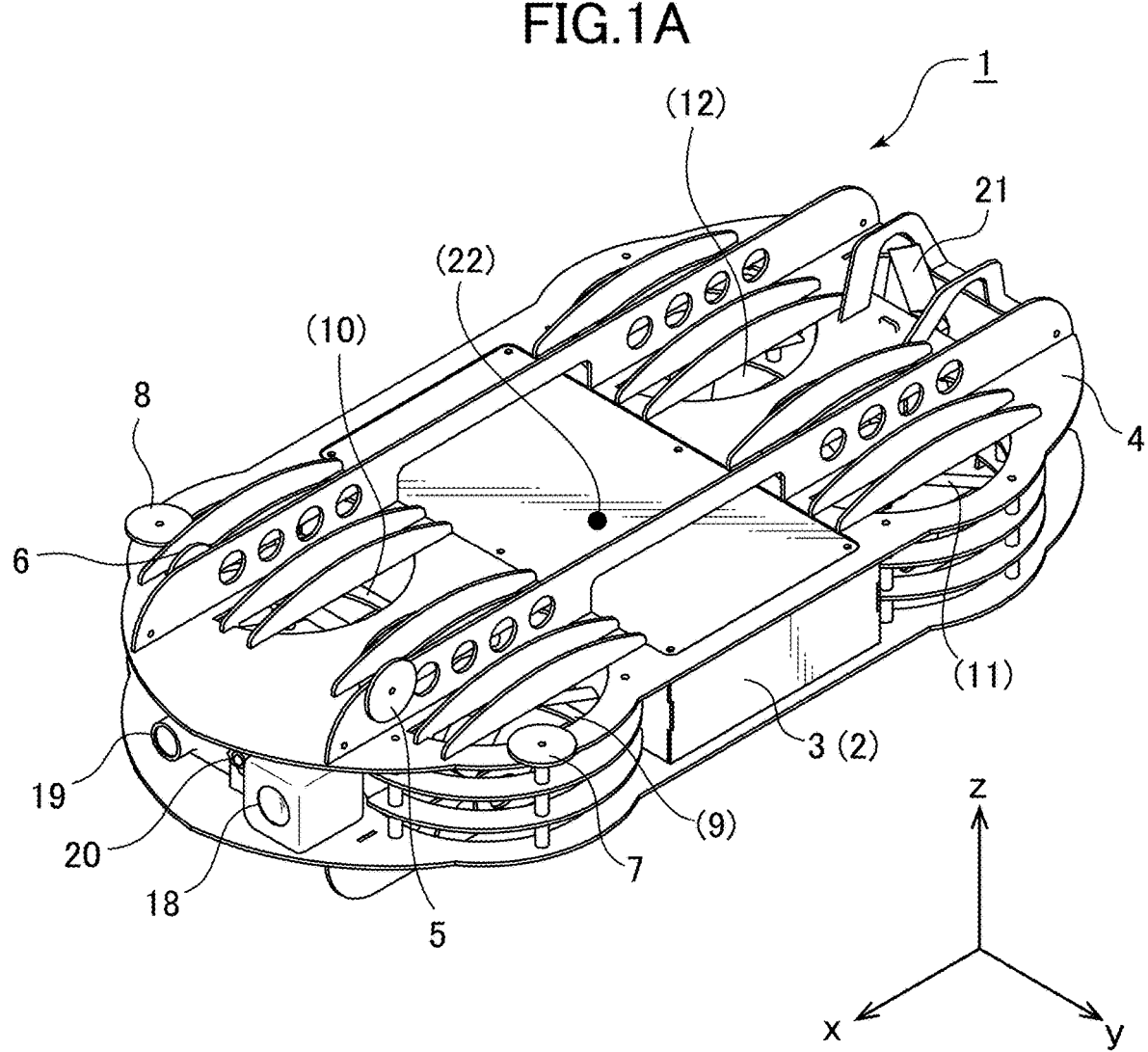
FIG. 1A A perspective view (oblique drawing) of an unmanned aerial vehicle as one embodiment of the present invention FIG. 1B A figure showing the unmanned aerial vehicle of FIG. 1A from the positive (forward) z-direction FIG. 1C A figure showing the unmanned aerial vehicle of FIG. 1A from the positive (forward) y-direction FIG. 1D A perspective view showing the unmanned aerial vehicle of FIG. 1A from the backward side of the forward direction FIG. 2A A perspective view showing the positional relationship between a rotor and a motor member in a comparative example FIG. 2B A figure showing the rotor and the motor member in FIG. 2A from the positive x-direction FIG. 2C A figure showing the cross section obtained by cutting the motor member in FIG. 2A on the A-A surface in FIG. 2B and showing the respective motor members FIG. 3 A perspective view showing the positional relationship between a rotor and a motor member in this embodiment FIG. 4 A block diagram showing the functions and configurations of the unmanned aerial vehicle in FIG. 1A FIG. 5 A figure showing the structure of a sewerage pipe line facility in which the unmanned aerial vehicle in FIG. 1A can be caused to fly FIG. 6 A figure showing the unmanned aerial vehicle in FIG. 1A flying inside the tubular space in the sewerage pipe line facility in FIG. 5

In the following, an unmanned aerial vehicle and a method using this as one embodiment of the present invention will be described with referring to the figures. However, it is noted that the unmanned aerial vehicle and the method using this of the present invention are not limited to particular aspects explained in the following, but they can be changed appropriately within the scope of the present invention. For example, the unmanned aerial vehicle of the present invention is not required to be an autonomous flying type unmanned aerial vehicle. The functions and configurations of the unmanned aerial vehicle can also be arbitrarily made and they are not limited to those in FIG. 4, as long as similar actions are possible. For example, actions to be performed by a plurality of components can be performed by a single component, such as by integrating the functions of the communication circuit into the main operation circuit, or actions to be performed by a single component shown in figures can be performed by a plurality of components such as by distributing the functions of the main operation circuit to a plurality of operation circuits. The autonomous control program for the unmanned aerial vehicle can be stored in a memory (recording) device such as a hard disk drive, read out and executed by the main operation circuit (the autonomous control program shown in figures can be divided (broken-down) into a plurality of program modules, and other arbitrary program can be executed by a main operation circuit etc.), or similar actions can be performed by an integration type (built-in type) system using a microcomputer etc. The unmanned aerial vehicle of the present invention is not required to have all components shown in the following embodiments (for example, when the propulsion of the unmanned aerial vehicle is controlled by controlling of the rotors 9-12 in FIG. 1B, it is not required to have a thrust generation propeller 21. If the unmanned aerial vehicle is caused to fly completely via control from outside without autonomous control, it is not required to have an autonomous control program or various databases.), and the method of the present invention is not required to have all shown method steps. The rotary wings for floating the unmanned aerial vehicles can be four or more arbitrary rotary wings, and they are not limited to four rotors 9-12 shown in FIG. 1B etc. The propeller for generating thrust can be an arbitrary propeller and it is not limited to the thrust generation propeller 21 shown in FIG. 1D etc. The air-frame (body) size of the unmanned aerial vehicle can be arbitrary defined. In addition, the closed-type space (confined space) is not required to be completely closed. It is sufficient if the closed-type space is a space which is at least partially closed to at least partially restrict the flight of the unmanned aerial vehicle. For example, also a tubular space in a sewerage pipe line connected to the outside via a man-hole as shown in the following embodiment is a closed-type space.

Configuration of Unmanned Aerial Vehicle

Figure 1B:
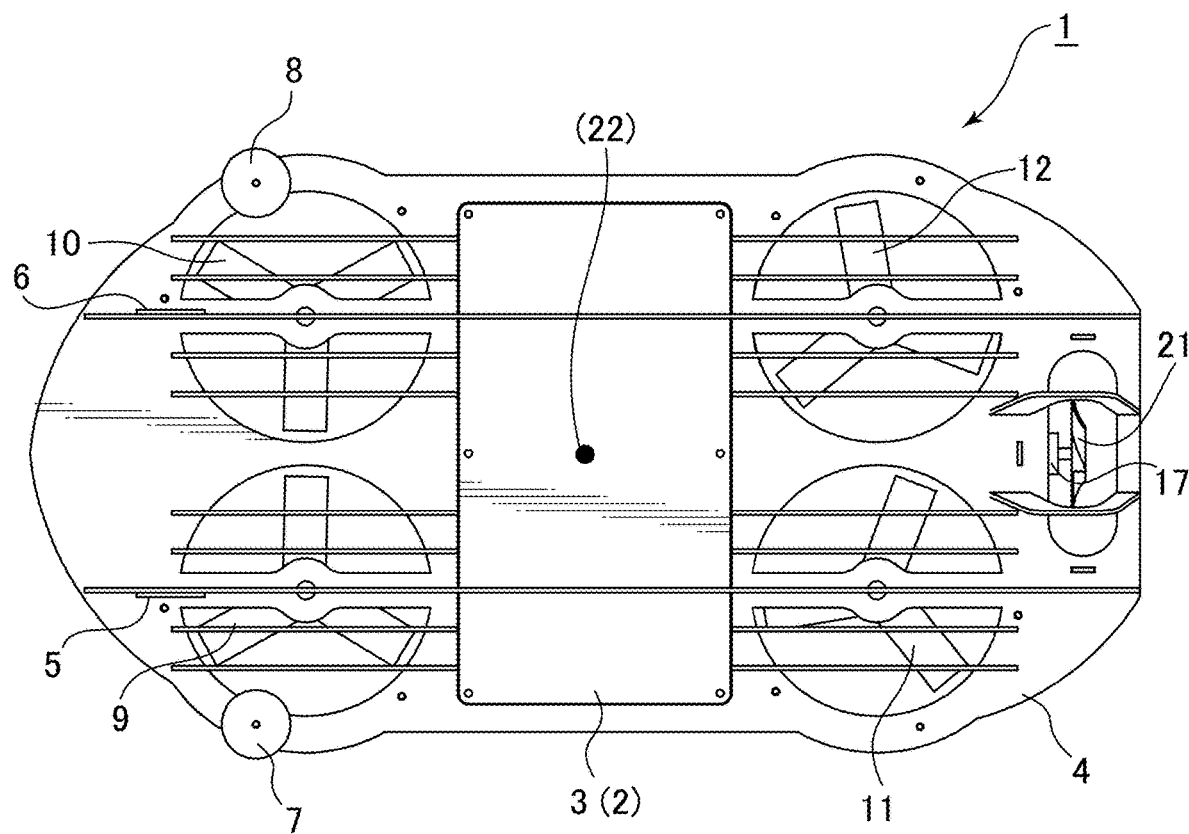
Figure 1C:
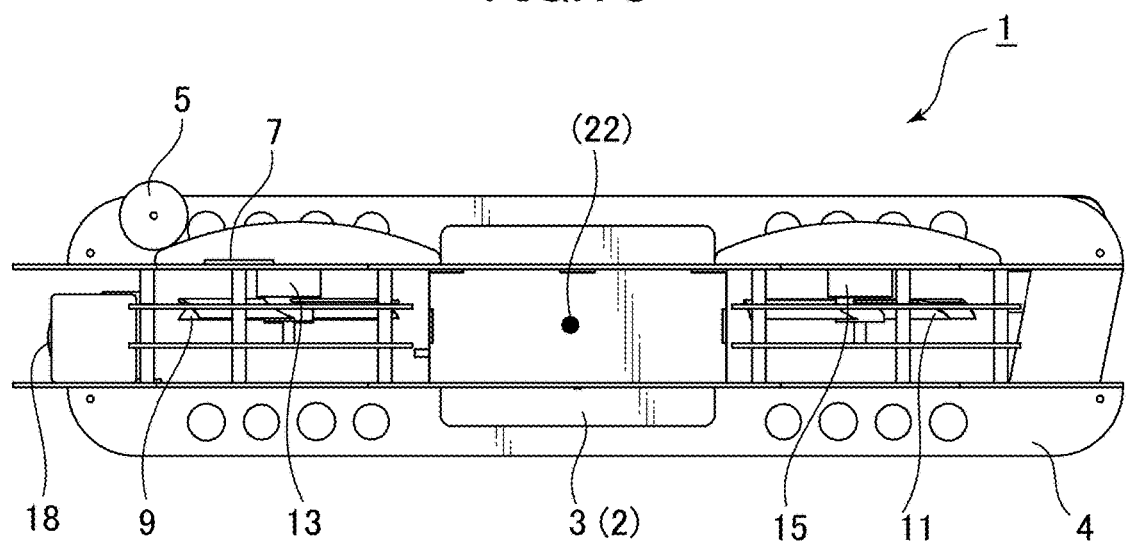
Figure 1D:
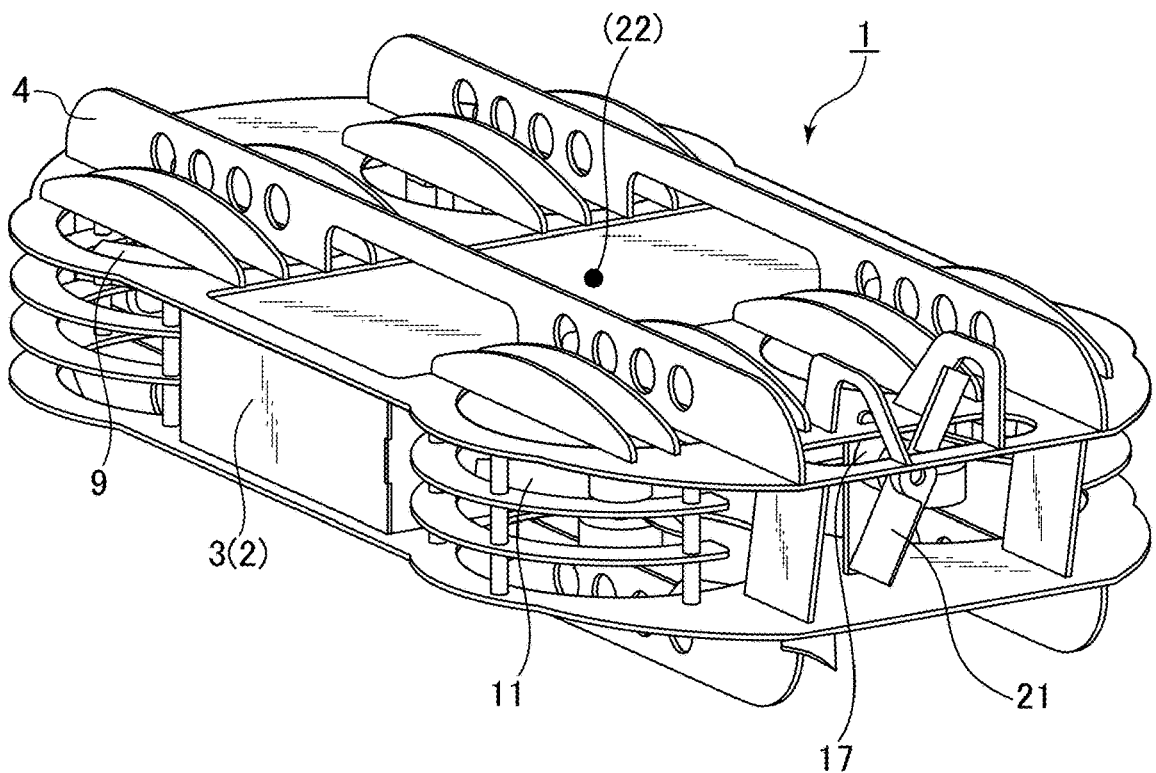

The appearance of an unmanned aerial vehicle as one embodiment of the present invention is shown in FIGS. 1A to 1D. FIG. 1A is a perspective view, FIG. 1B is a figure from the positive z-direction of FIG. 1A, FIG. 1C is a figure from the positive y-direction, and FIG. 1D is a perspective view from the backward side of the forward direction (members for preceding impact are omitted.). The unmanned aerial vehicle 1 is designed to have a size with the overall width (the width in the y-direction in FIG. 1A) of approximately 250 mm, the overall length (the width in the x-direction in FIG. 1A) of approximately 550 mm in order to enable to fly in a closed-type space with the diameter (aperture) of approximately 400 mm. The unmanned aerial vehicle 1 has a main body part 2 (stored in a waterproof case 3), five motors 13 to 17 driving by control signals from the main body part 2 (for motors 14, 16, see FIG. 4), four rotors (rotary wings) 9 to 12 rotating by driving of the respective motors 13 to 16 to float the unmanned aerial vehicle 1 (Adjacent rotors rotate reversely to each other. For example, rotors 9, 12 rotate clockwise when seen from the positive z-direction, and rotors 10, 11 rotate counter-clockwise when seen from the positive z-direction.), a thrust generation propeller 21 which generates a thrust of the unmanned aerial vehicle 1 by rotating by driving of the motor 17, an investigation camera 18, a forward camera 19, and an ultrasonic sensor 20. The respective components are integrated using a frame 4, and four members for preceding impact 5 to 8 are attached to the frame 4.

The members for preceding impact 5 to 8 are constructed as wheels, and they are members for preceding impacts when the unmanned aerial vehicle 1 impacts on the boundary surface of the closed-type space such as a wall surface of a sewerage pipe line. As shown in FIGS. 1A to 1C, the members for preceding impact 5 to 8 are preferably positioned on the forward (positive x-direction in FIG. 1A) side relative to the center of gravity 22 of the unmanned aerial vehicle 1. By applying such the positions, the members for preceding impact 5 to 8 impact on (collide with) the boundary surface of the closed-type space on the forward side relative to the center of gravity 22, thus the direction of travelling of the unmanned aerial vehicle 1 at that time can be stabilized on the forward side. The members for preceding impacts can be constructed as members other than wheels. For example, it is possible to fix etc. spherical members for preceding impacts at the upper part on the forward side of the unmanned aerial vehicle 1.

The investigation camera 18 is a camera for taking still images or moving images (video) while the unmanned aerial vehicle 1 is flying inside the closed-type space, and in one example, it is possible to use a commercially available camera such as GoPro session (Tajima motor corporation). The forward camera 19 is a camera for taking still images or moving images in the direction of travel while the unmanned aerial vehicle 1 is flying inside the closed-type space, data of the taken still images or moving images are transmitted to an external device (such as a computer provided with a display) at any time as required, and a navigator (operator) can navigates (operates) the unmanned aerial vehicle 1 while checking it. The ultrasonic sensor 20 is a sensor for detecting blocking objects etc. in the forward direction, and the ultrasonic sensor 20 can measure the distance from the blocking objects etc. by transmitting ultrasonic wave in the direction of travel, while the unmanned aerial vehicle 1 is flying inside the closed-type space, and by receiving the reflected wave.

Figure 2A:
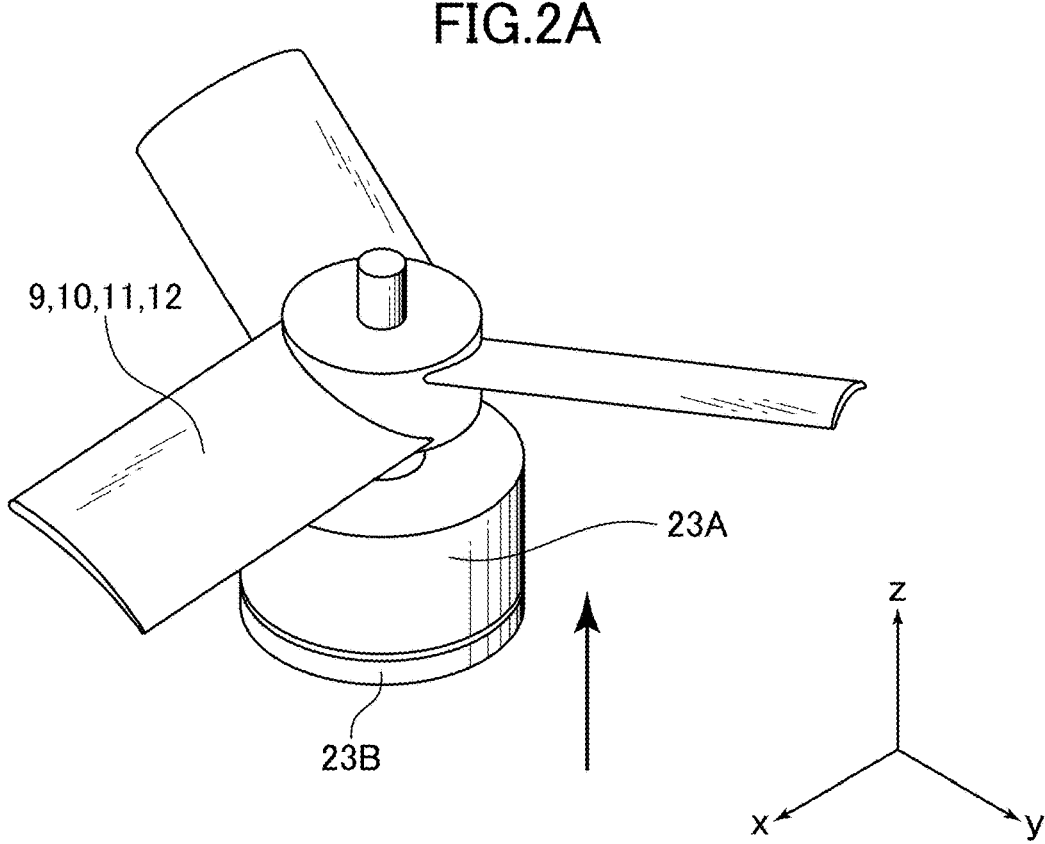
Figure 2C:
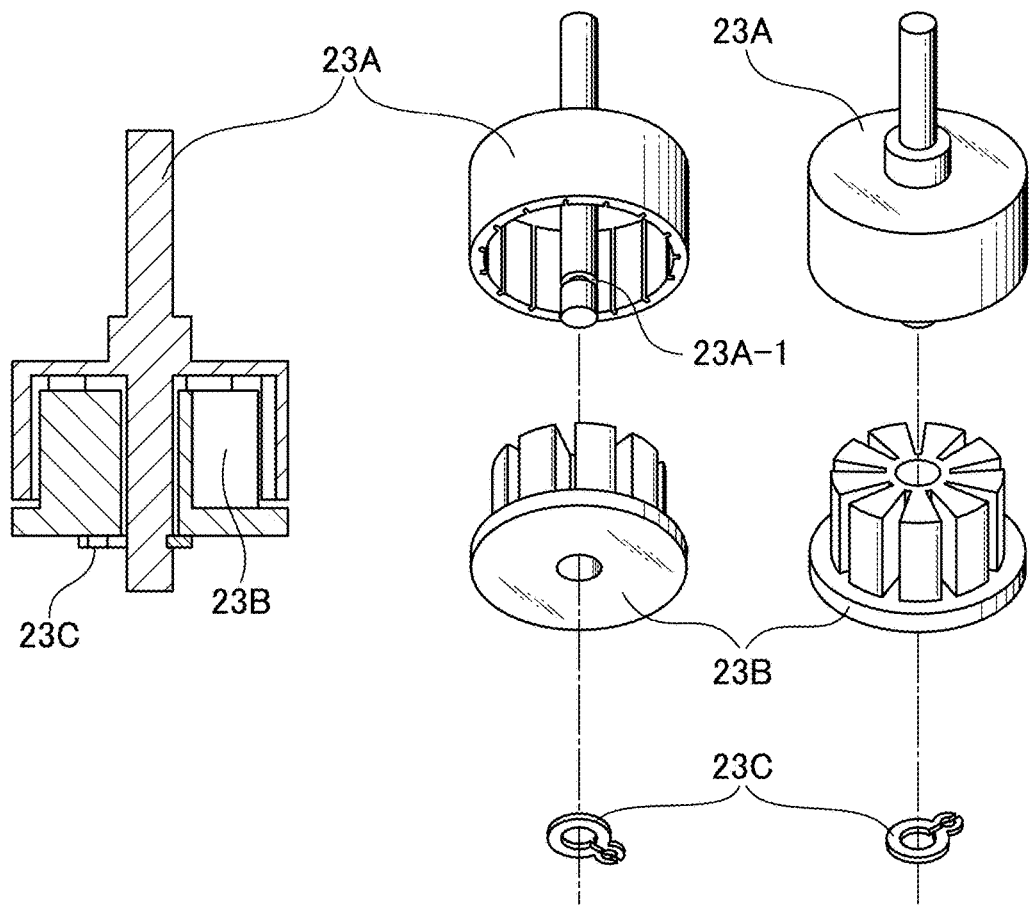

As shown in FIG. 1C, motors 13, 15 are positioned respectively above the rotors 9, 11 (on positions with higher gravitational potential) and the motors 13, 15 are configured to drive the rotors 9, 11 respectively. Also the motors 14, 16 (see FIG. 4) are positioned respectively above the rotors 10, 12 similarly and the motors 14, 16 are configured to drive these rotors respectively. The advantage by employing such the configuration will be described with comparing to a comparative example in which the motors are positioned under the rotors as shown in FIGS. 2A to 2C. In this regard, it is noted that the unmanned aerial vehicle and the method using this of the present invention can be embodied even when the positional relationship between the rotors and motors in accordance with that comparative example is employed.

FIG. 2A is a perspective view showing the positional relationship between a rotor and a motor member in a comparative example, FIG. 2B is a figure showing the rotor and the motor member in FIG. 2A from the positive x-direction in FIG. 2A, and FIG. 2C is a figure showing the cross section obtained by cutting the motor member in FIG. 2A on the A-A surface in FIG. 2B and showing the respective motor members. Rotors 9, 10, 11, 12 are fixed (see FIG. 2B) to rod-like projection portions of motor members 23A (see FIG. 2C), and they rotate about the rod-like projection portions as the rotation axes. Rotors 9, 10, 11, 12 are subjected to (receive) force in the arrow direction in FIG. 2A (positive z-direction) by rotating, and pull the motor members 23 A in the same direction. As shown in FIG. 2C, a motor member 23A and a motor member 23 B are fitted to each other, but they are not adhered. Therefore, when the motor member 23A is pulled in the positive z-direction, there is a risk that the motor member 23 A escapes from the motor member 23B. In order to avoid that escaping, a motor member 23C is used as a fastening tool in the configuration of the comparative example (see FIGS. 2B, 2C). As shown in FIG. 2C, it is possible to avoid the escaping of the motor member 23A from the motor member 23B by fitting the motor member 23C (after the motor member 23A and the motor member 23B are fitted to each other) to the groove part 23A-1 provided on the motor member 23A. However, it is necessary to release the motor member 23C at the time of maintenance of motors.

Figure 3:
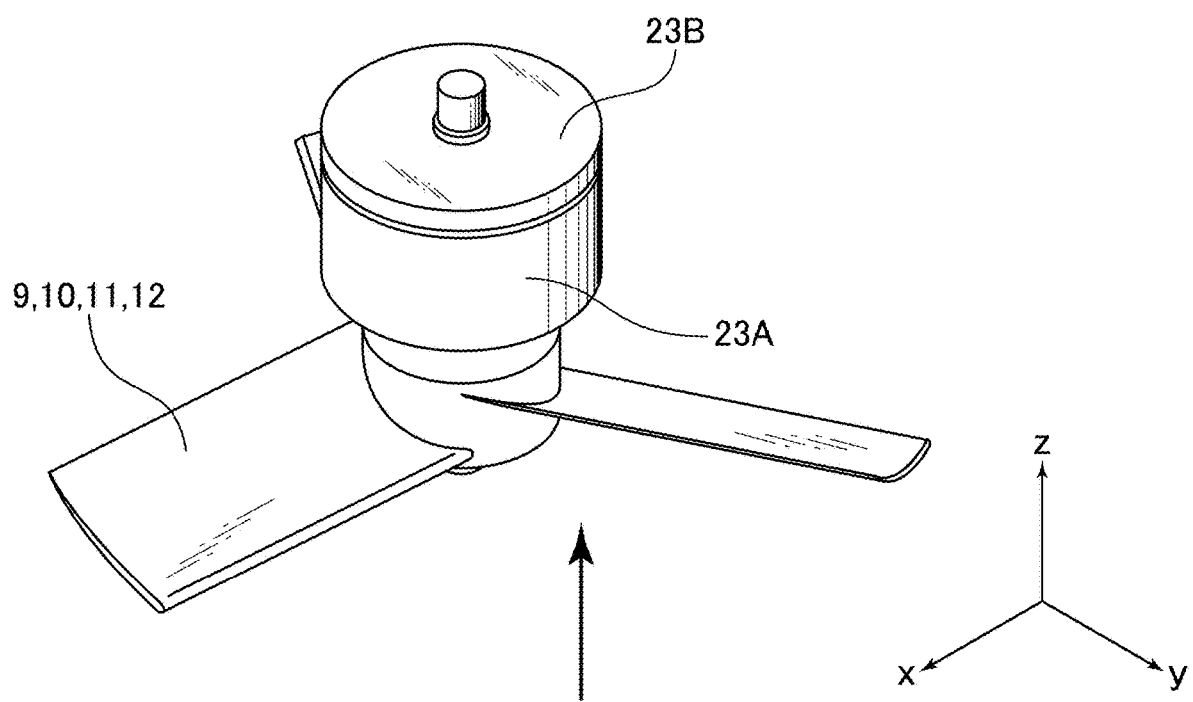

A perspective view of FIG. 3 shows the positional relationship between a rotor and a motor member in this embodiment. It is different from the comparative example in that rotors 9, 10, 11, 12 are positioned under the motor members 23A, 23B and in that no motor member 23C is used, and the remaining configurations are similar to the comparative example. Rotors 9, 10, 11, 12 are fixed (see FIG. 2B) to rod-like projection portions of motor members 23A (see FIG. 2C), and they rotate about the rod-like projection portions as the rotation axes. Rotors 9, 10, 11, 12 are subjected to (receive) force in the arrow direction in FIG. 3 (positive z-direction) by rotating, and push the motor members 23 A in the same direction. By this, a motor member 23A is pushed onto a motor member 23B, thus it is not necessary to prevent the motor member 23A from escaping from the motor member 23B. Therefore, the motor member 23C becomes unnecessary in the configuration of FIG. 3, thus maintenance of motors become easier.

Figure 4:
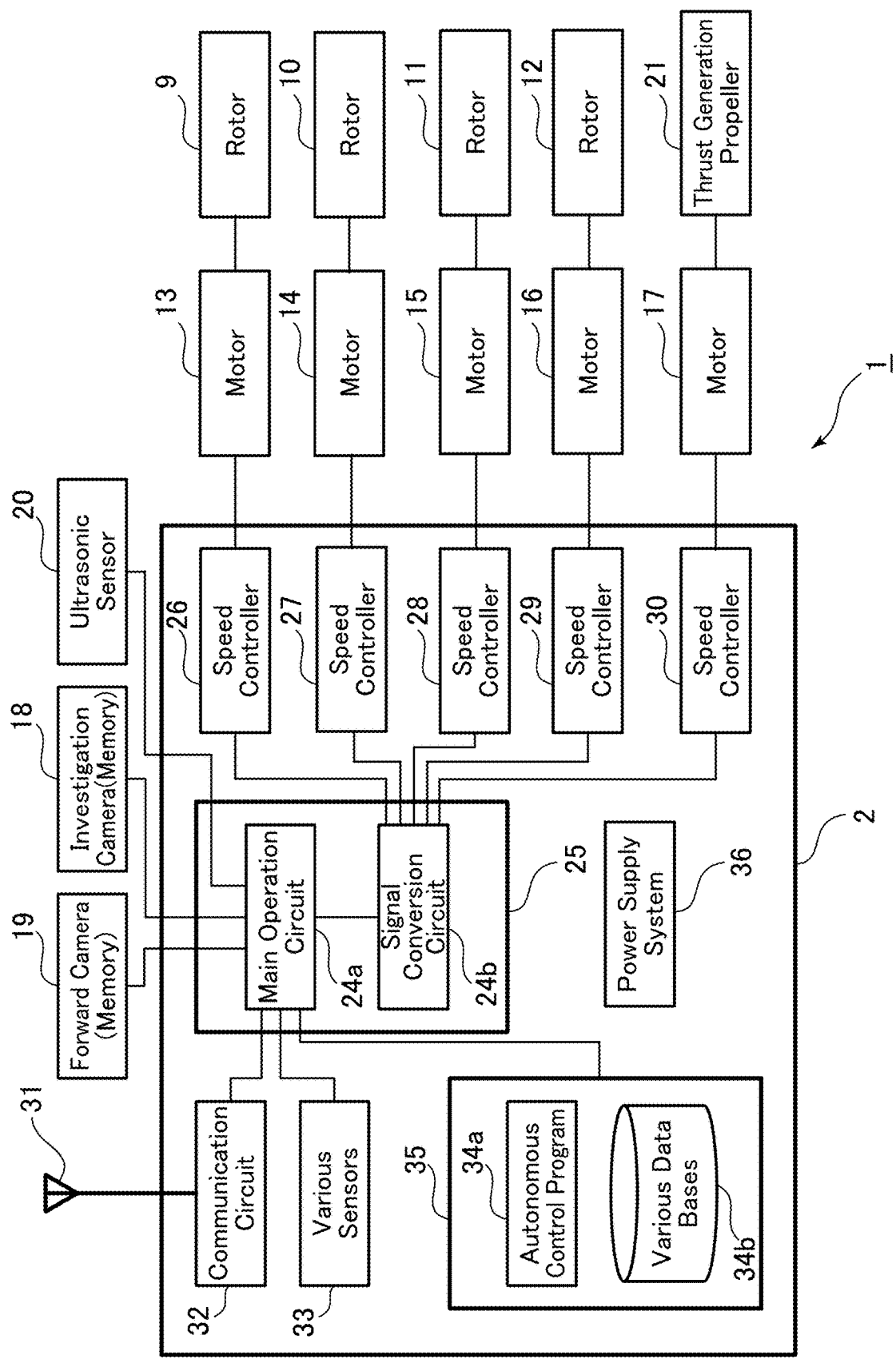

FIG. 4 is a block diagram showing the functions and configurations of the unmanned aerial vehicle in FIG. 1A. The main body 2 of the unmanned aerial vehicle 1 has:

- a main operation circuit 24a which is configured by a processor, a tentative (volatile) memory, etc. and which performs various operations;
- a signal conversion (transformation) circuit 24b which performs processing such as conversion of control command value data obtained by the operations by the main operation circuit 24a into pulse signals for the motors 13 to 17 where the signal conversion circuit 24b is configured by a processor, a tentative memory, etc. (an operation circuit including the main operation circuit 24a and the signal conversion circuit 24b is referred to as a control signal generation circuit 25.);
- speed controllers (ESC: Electric Speed Controller) 26 to 30 which convert the pulse signals generated in the control signal generation circuit 25 into driving electric currents for the motors 13 to 17;
- a communication antenna 31 and a communication circuit 32 in charge of transmitting/receiving of various data signals to/from the outside;
- a sensor part 33 including various sensors such as a GPS (Global Positioning System) sensor, an attitude sensor, an altitude sensor, an orientation (azimuth) sensor;
- a memory (recording) apparatus 35 configured by a memory device such as a hard disk drive recording an autonomous flight program 34a, various databases 34b etc.; and
- a power source system 36 including a battery device such as a lithium polymer battery and a lithium ion battery, and electric power distribution system for the respective elements.

In addition to the above, the unmanned aerial vehicle 1 can have arbitrary functional parts, information, etc., in accordance with the functions or intended uses. As an example, in a case where the unmanned aerial vehicle 1 performs an autonomous flight according to a flight plan, the memory apparatus 35 records flight plan information as data indicating a flight plan as some rules which should be followed during the flight such as: a flight plan path (route) as a set of the starting position of the flight, the destination position, and the checkpoint positions (latitudes, longitudes, altitudes) which should be gone through between the departure at the starting position and the arrival at the destination position; speed restrictions; and altitude restrictions. The unmanned aerial vehicle 1 flies in accordance with the flight plan when the flight plan information is read by the main operation circuit 24a and the autonomous control program 34a is executed by the main operation circuit 24a. In particular, the current (present) position, velocity, etc. of the unmanned aerial vehicle 1 are determined from information obtained at the various sensors in the sensor part 33, and the control command values for the rotors 9-12 and the thrust generation propeller 21 are calculated (operated) at the main operation circuit 24a by comparison to the target values of the flight plan paths, speed restrictions, altitude restrictions, etc. defined in the flight plan. Further, the data indicating the control command values are converted into the pulse signals at the signal conversion circuit 24b (generation of control signals) and sent to the speed controllers 26 to 30, the speed controllers 26 to 30 respectively convert the pulse signals into driving electric currents and output them to the motors 13 to 17, thus control driving of the motors 13 to 17 to control the rotation speeds etc. of the rotors 9 to 12 and the thrust generation propeller 21. Flight of the unmanned aerial vehicle 1 is controlled in this way. In an example, the numbers of rotations (rotational speeds) of the rotors 9 to 12 are increased (risen) in response to control commands for increasing the altitude of the unmanned aerial vehicle 1 (the number of rotations are decreased when decreasing the altitude), the number of rotations of the thrust generation propeller 21 is increased in response to control commands for accelerating the unmanned aerial vehicle 1 in the forward direction (positive x-direction in FIG. 1A) (the number of rotations is decreased when decelerating), and the numbers of rotations of the rotors 10, 12 are decreased while the numbers of rotations of the rotors 9, 11 are maintained (kept) in response to control commands for tilting the unmanned aerial vehicle 1 by rolling rotation about the x-axis in FIG. 1A (counter-clockwise when seen from the positive x-direction). Controls such as the above are performed. In this regard, the acceleration (deceleration) in the forward direction of the unmanned aerial vehicle 1 can be performed also by controlling the number of rotations of the rotors 9 to 12 such as by reducing the number of rotations of the rotors 9, 10 while increasing the number of rotations of the rotors 11, 12 (oppositely controlled when decelerating). It is also possible to make the unmanned aerial vehicle 1 fly without using the thrust generation propeller 21. In this regard, when the unmanned aerial vehicle 1 is used for the intended use of making the unmanned aerial vehicle 1 fly inside the closed-type space as described below, simplified controls such as controls where, the numbers of rotations of all the rotors 9 to 12 are kept at the same number (only controls for equally increasing or decreasing the numbers of rotations of all the four rotors 9 to 12 are performed) to float/land (land on the ground or land on water) the unmanned aerial vehicle 1 while controlling the number of rotations and rotational direction of the thrust generation propeller 21 to control the velocity in the forward direction (positive x-direction in FIG. 1A), are also possible. Flight record information such as the flight path which the unmanned aerial vehicle 1 actually flied (went through) (such as air-frame positions of the unmanned aerial vehicle 1 at respective times) and various sensor data is recorded in the various databases 34b during the flight at any time as required.

Examples of commercially available autonomous flight-type unmanned aerial vehicles include: Mini Surveyor MS-06LA (Autonomous Control Systems Laboratory Ltd.); Snap (Vantage Robotics); AR. Drone 2.0 (Parrot); Bebop Drone (Parrot) and the like.

In this regard, when the unmanned aerial vehicle 1 flies under control from outside (under external control), the unmanned aerial vehicle 1 receives data indicating control command values (received from a controller device of the navigator etc.) via the communication antenna 31 and the communication circuit 32, converts the data into pulse signals at the signal conversion circuit 24b (generation of control signals), and hereinafter similarly performs flight control by controlling the rotation speeds of the rotors 9 to 12 and the thrust generation propeller 21 using the speed controllers 26 to 30 and the motors 13 to 17. Also even in this case, partially autonomous control and control from the outside can be combined, such as by calculating the command values for attitude control by comparing etc. the data from the attitude sensor and the target values of the attitude to perform the attitude control via reading data, at the main operation circuit 24a, indicating attitude information of the unmanned aerial vehicle 1 obtained from the attitude sensor (gyro-sensor, magnetic sensor) among the various sensors in the sensor part 33, and via executing, at the main operation circuit 24a, the autonomous control program 34a (in this case, the final (definitive) control command values are calculated from data indicating control command values received from the external controller etc. and data indicating attitude control command values by executing, at the main operation circuit 24a, the autonomous control program 34a. By converting, at the signal conversion circuit 24b, data indicating those control command values into pulse signals, control signals including attitude control signals are generated.). In the flight with taking images described below, it is assumed that the unmanned aerial vehicle 1 flies basically by control signals from the external controller device etc., and it is assumed that only the attitude is controlled in an autonomous fashion. However, it is also possible to perform a similar flight with taking images even by an unmanned aerial vehicle 1 which performs completely autonomous flight or which performs flight completely under control from the outside.

Flight with Taking Images Inside the Closed-Type Space by the Unmanned Aerial Vehicle In the following, as an example of flight with taking images inside the closed-type space by the unmanned aerial vehicle 1, a flight with taking images in a sewerage pipe line will be described using FIGS. 5 to 9.

Figure 5:
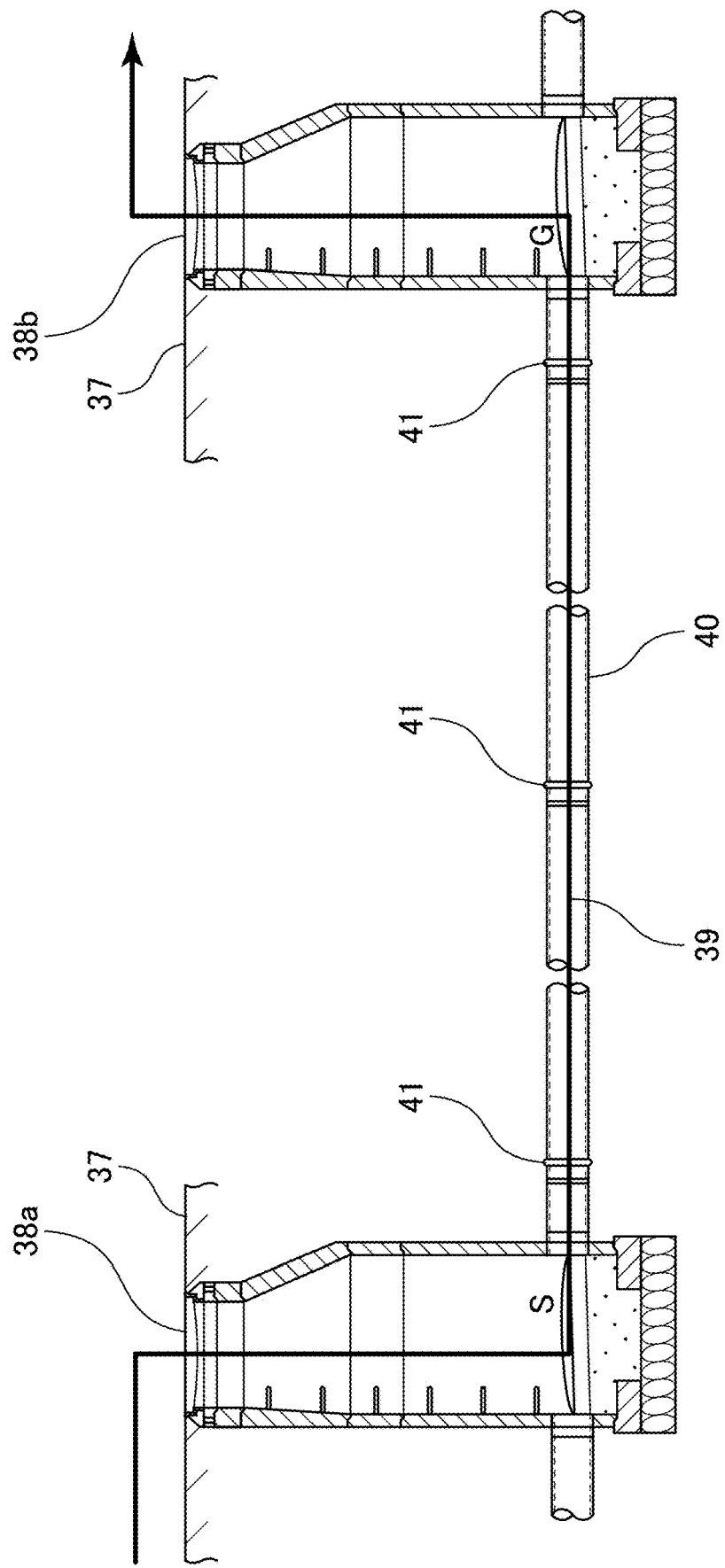

FIG. 5 shows the structure of a sewerage pipe line facility in which the unmanned aerial vehicle in FIG. 1A can be caused to fly. A man-hole 38a provided on the ground surface 37 leads to (is connected to) the sewerage pipe line 39, and going in the right direction of FIG. 5 in the sewerage pipe line 39 leads to (reaches) another man-hole 38b (The sewerage pipe line 39 is depicted with dividing the same at two intermediate positions in FIG. 5, but this is just an expediential expression, and the actual sewerage pipe line 39 is formed as a continuous sewerage pipe line 39 longer than that depicted.). A boundary surface of the closed-type space is defined by an inner wall 40 of the sewerage pipe line 39, and there are connecting parts 41 in the sewerage pipe line 39 at predetermined intervals in the right direction of FIG. 5.

When performing a flight while taking pictures by the unmanned aerial vehicle 1 in the sewerage pipe line 39, the unmanned aerial vehicle 1 is firstly caused to enter the man-hole 38a and descend to the depth of the sewerage pipe line 39. In one example, the unmanned aerial vehicle 1 is caused to descend by providing a holding base at the edge of a pole of which the length is the same degree as the depth of the man-holes 38*a*, 39*b*, placing the unmanned aerial vehicle 1 on the holding base, and inserting the pole into the man-hole 38*a*. When using an autonomous flight-type unmanned aerial vehicle 1, it is possible to: record the position of the man-hole 38*a*, the depth of the sewerage pipe line 39 etc. as the flight plan path in the memory apparatus 35 in advance; read, by the main operation circuit 24*a*, flight plan information including data of the flight plan path; and execute, by the main operation circuit 24*a*, the autonomous control program 34*a* to cause the unmanned aerial vehicle 1 to autonomously fly to lead the unmanned aerial vehicle 1 to one edge of the sewerage pipe line 39 (the left edge of the sewerage pipe line 39 in FIG. 5, and hereinafter as the starting position S of the flight with taking images). Alternatively, it is also possible to transmit control signals from an external controller device to the unmanned aerial vehicle 1 and operate (navigate) the unmanned aerial vehicle 1 to lead the unmanned aerial vehicle 1 to the starting position S of the flight with taking images.

Figure 6:
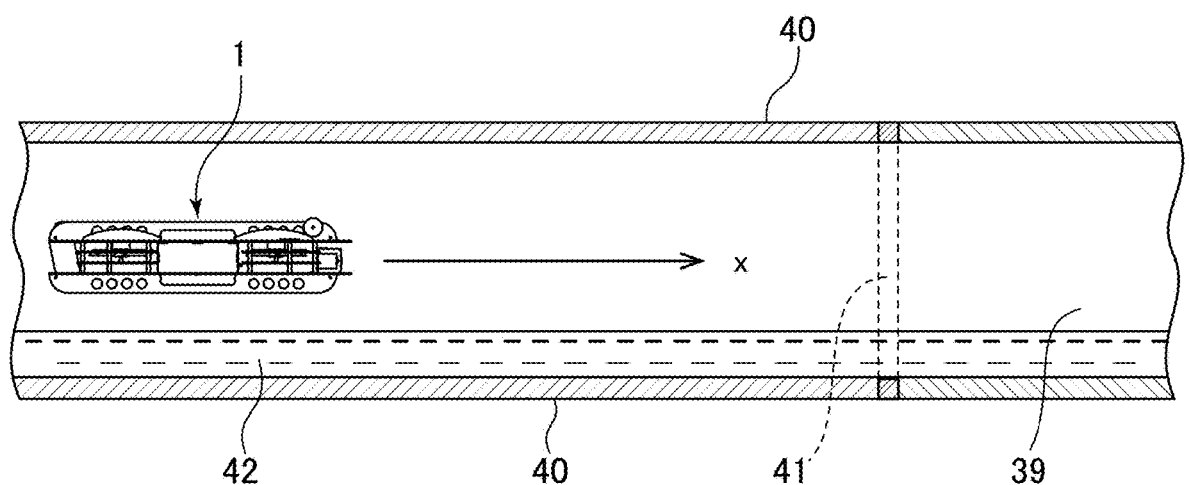

The unmanned aerial vehicle 1 starts flight with taking images from the starting position S of the flight with taking images toward the right direction of FIG. 5 (taking that direction as the positive x-direction of FIG. 1A, namely the direction of travel) (FIG. 6). In the case of manual control from an external controller by an operator, the unmanned aerial vehicle 1 receives a control signal instructing to go forward, and takes still images or moving images in the sewerage pipe line 39 by means of the investigation camera 18 and the forward camera 19 while flying in the direction of travel. In this regard, water 42 usually exists in the sewerage pipe line 39, the water level is changing at any time, and it is also possible to obtain force for floating by the water surface effect accompanying rotations of the rotors 9 to 12 (Even in a case where there is no water 42, it is possible to obtain a similar effect from the inner wall 40.).

Data of still images or moving images taken by means of the investigation camera 18 are stored in the internal (built-in) memory of the investigation camera 18. Data of still images or moving images taken by means of the forward camera 19 are stored in the internal memory of the forward camera 19 and transmitted, at any time as required, from the communication antenna 31 by means of the communication circuit 32 to an external computer of the operator. The operator displays, using the received data and on a display which the external computer has, the still images or moving images taken by the forward camera 19. The operator operates the unmanned aerial vehicle 1 by means of the external controller while checking the displayed still images or moving images. In one example, the unmanned aerial vehicle 1 is operated while the distance which the unmanned aerial vehicle 1 has passed through is comprehended taking the connecting parts 41 appearing in the displayed still images or moving images as marks.

Figure 7:
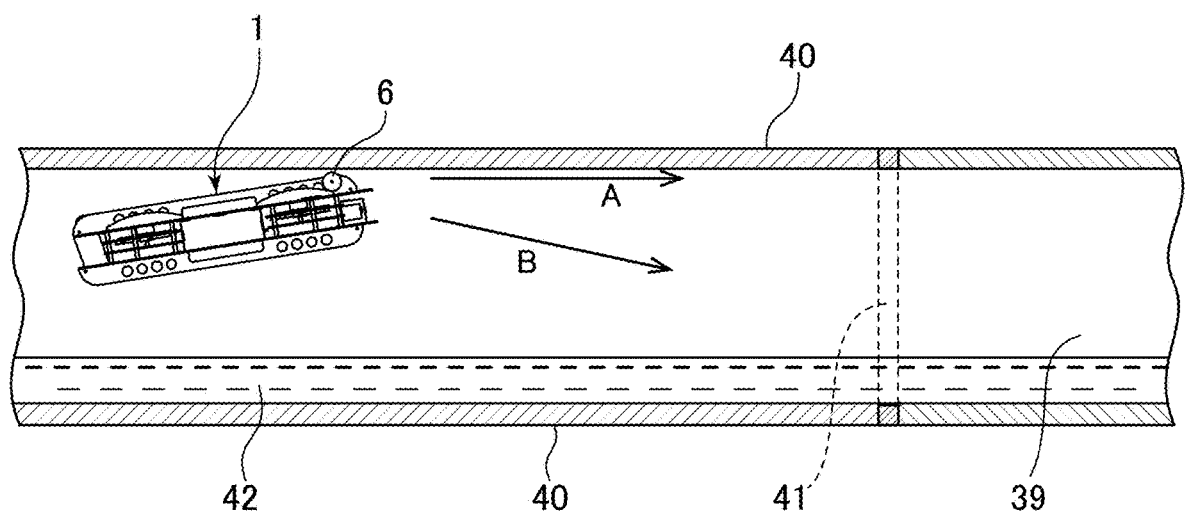
FIG. 7 A figure showing the state (situation) of the unmanned aerial vehicle impacting on the inner wall of the sewerage pipe line during a flight shown in FIG. 6

During the flight with taking images, the unmanned aerial vehicle 1 may impact on (collide with) the inner wall 40 of the sewerage pipe line 39 for some reasons such as problems in accuracy of manual control by means of the external controller and problems in accuracy of autonomous control of the attitude. The aspect (situation) in this case is shown in FIG. 7. The attitude of the unmanned aerial vehicle 1 is corrupted for some reasons, and the unmanned aerial vehicle 1 impacts, at the upper part on the forward side of the air-frame, on the inner wall 40. However, the member for preceding impact 5 (see FIG. 1A etc.) and the member for preceding impact 6 impact on the inner wall 40 in advance, and the unmanned aerial vehicle 1 continues to travel forwardly (in the arrow direction of FIG. 7). Since the members for preceding impact 5 to 8 are configured as wheels in this embodiment, the members for preceding impact 5, 6 rotate while being in touch with the inner wall 40, as shown by the arrow A in FIG. 7, and the unmanned aerial vehicle 1 travels like it is along the upper surface of the inner wall 40. As another example, in a case where the members for preceding impact are fixed, as spherical members, on the upper part on the forward side of the unmanned aerial vehicle 1, the unmanned aerial vehicle bounds toward the direction shown by the arrow B in FIG. 7 after the member for preceding impact of the unmanned aerial vehicle 1 impacts on the upper surface of the inner wall 40. Anyway, the unmanned aerial vehicle 1 can continue the flight forwardly. Even in a case where the unmanned aerial vehicle 1 impacts on a side surface of the inner wall 40, the unmanned aerial vehicle 1 can continue the flight forwardly by similar preceding impact by the member for preceding impact 7 or 8.

Figure 8:
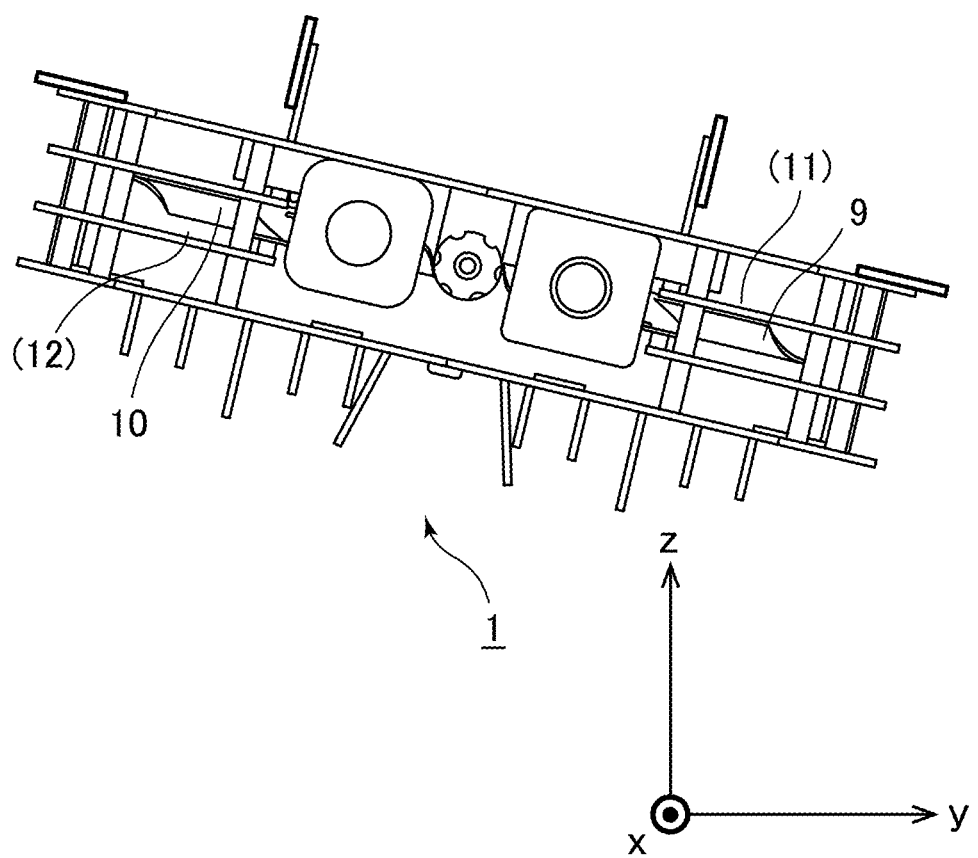
FIG. 8 A figure showing the state of the unmanned aerial vehicle in FIG. 1A rotating about the x-axis (rolling rotation) and being tilted FIG. 9 A figure showing an example of an image inside of the sewerage pipe line to be taken by means of the forward camera

During the flight with taking images, the unmanned aerial vehicle 1 may be tilted for some reasons, similarly such as problems in accuracy of manual control or autonomous attitude control. As an example, FIG. 8 shows the state of the unmanned aerial vehicle 1 rotating about the x-axis in FIG. 1A (rolling rotation) and being tilted. In order to recover the attitude of the air-frame to be flat (horizontal), it is assumed that the lower side of the airframe (the side of positive y-direction) is lifted (elevated) by increasing the numbers of rotations of the rotors 9 and 11, but there is a risk that the air-frame is lifted and the unmanned aerial vehicle 1 impacts on the upper surface of the inner wall 40 in this case. Therefore, it is preferable to recover the attitude to be flat by making the higher side (the side of the negative y-direction) of the air-frame descend by reducing the numbers of rotations of the rotors 10 and 12. Such the attitude control is performed typically by reading data indicating the attitude information of the unmanned aerial vehicle 1 obtained from the attitude sensor as described above at the main operation circuit 24*a* and executing the autonomous control program 34*a*, but it is also possible to perform the attitude control by: transmitting control signals (control signals instructing to perform rolling rotation in the opposite direction relative to the tilt in FIG. 8) indicating the control command values of the attitude from the external controller device; receiving the control signals at the unmanned aerial vehicle 1; and executing the autonomous control program 34*a* at the main operation circuit 24*a*. With regard to tilt of the unmanned aerial vehicle 1 due to arbitrary rotations such as rotation about y-axis (pitch) and rotation about z-axis (yaw), it is preferable to recover the attitude similarly by reducing the number of rotations of one or some of the rotors.

The flight with taking images ends by the unmanned aerial vehicle 1's arrival at the other edge of the sewerage pipe line 39 (the right edge in the sewerage pipe line 39 in FIG. 5, and hereinafter as the end position G of the flight with taking images). The unmanned aerial vehicle 1 is retrieved by, for example, inserting the pole, the edge of which a holding base is provided, into the man-hole 38*b*, placing the unmanned aerial vehicle 1 on the holding base, and pulling it upward. It is also possible to pull up the unmanned aerial vehicle 1 from the end position G via autonomous flight similarly to the introduction into the start position S of the flight with taking images. The states of the sewerage pipe lines 39, the inner wall 40, etc. can be checked by removing the investigation camera 18 from the retrieved unmanned aerial vehicle 1 and watching the still images or moving images stored in the memory.

Figure 9:
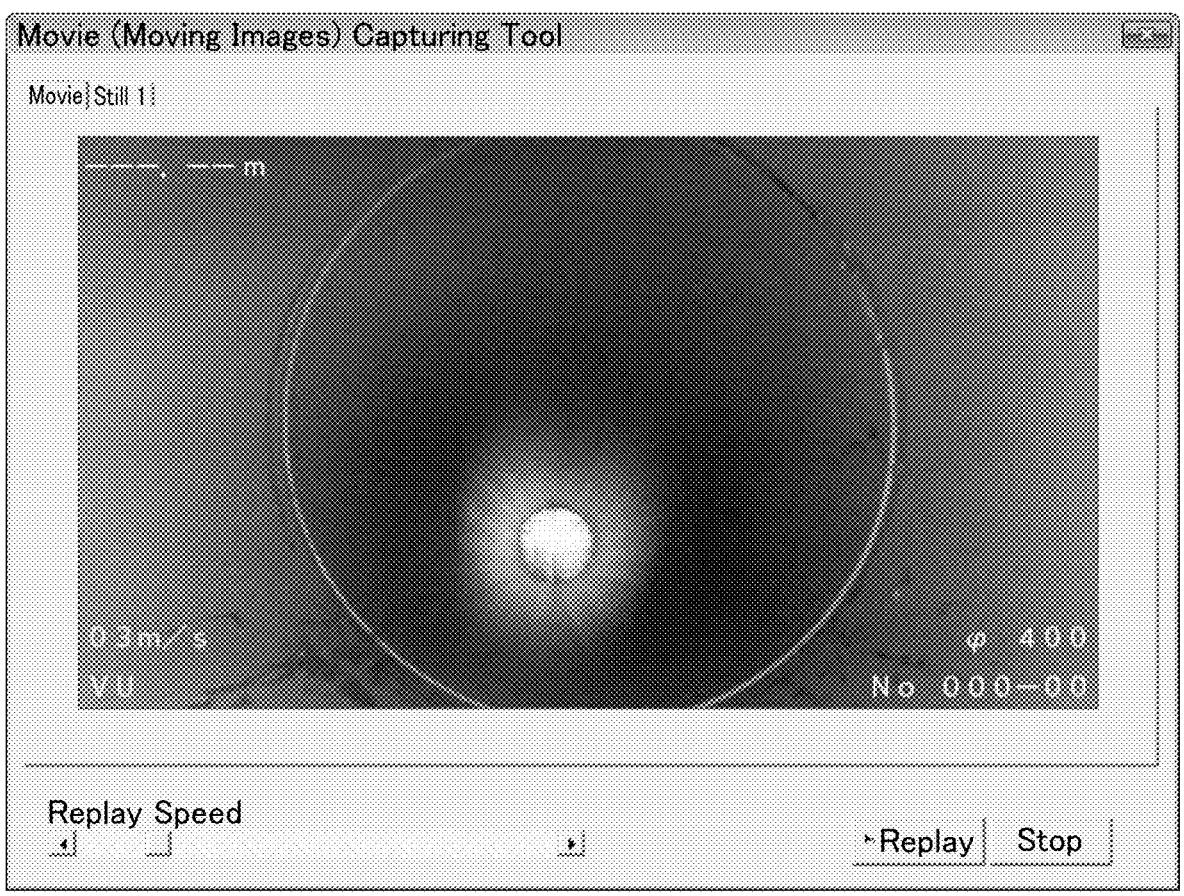

FIG. 9 shows an example of an image inside of the sewerage pipe line to be taken by means of the forward camera. It is assumed (expected) that similar images can be obtained via flight with taking images by the unmanned aerial vehicle 1 on which the forward camera 19 is provided. The operator can operate the unmanned aerial vehicle 1 by means of the external controller device while watching still images or moving images in first-person view taken by the forward camera 19 as shown in FIG. 9. After the flight with taking images, the state of the sewerage pipe line 39 such as cracks in the inner wall 40 and dislocations of packings at the connecting parts 41 can be checked by removing the investigation camera 18 from the retrieved unmanned aerial vehicle 1 and watching still images or moving images stored in the memory.

INDUSTRIAL APPLICABILITY

The present invention can be utilized for flight with taking images in arbitrary closed-type spaces such as in water-supply pipe lines, sewerage pipe lines, drainage ditches, cave passages, ducts, pipe shafts, and gas pipe lines.

REFERENCE SIGNS LIST

1 unmanned aerial vehicle
2 main body part
3 waterproof case
4 frame
5-8 member for preceding impact
9-12 rotor
13-17 motor
18 investigation camera
19 forward camera
20 ultrasonic sensor
21 thrust generation propeller
22 center of gravity
23A motor member
23B motor member
23C motor member
23A-1 groove
24a main operation circuit
24b signal conversion circuit
25 control signal generation circuit
26-30 speed controller
31 communication antenna
32 communication circuit
33 various sensors
34a autonomous control program
34b various databases
35 memory apparatus
36 power source system
37 ground surface
38a, b man-hole
39 sewerage pipe line
40 inner wall
41 connecting part
42 water

The invention claimed is:

1. An unmanned aerial vehicle comprising:
a frame that is elongated in a forward direction of travel from a forward end of the frame to an aft end of the frame;
four rotary wings, wherein a first pair of the four rotary wings is positioned on a front-half side of the frame and a second pair of the four rotary wings is positioned on a back-half side of the frame, and wherein the four rotary wings are positioned inside the frame;
a plurality of rotatable components for preceding impact supported by the frame along an upper surface of the front-half side of the frame;
a driver that drives the four rotary wings;
a control signal generation circuit that is configured to generate a control signal for causing the driver to drive the four rotary wings, wherein the control signal generation circuit is positioned between the first pair of the four rotary wings and the second pair of the four rotary wings; and
an imaging camera,
wherein the unmanned aerial vehicle is configured to fly inside a closed-type space by driving the four rotary wings and to simultaneously capture images inside the closed-type space with the imaging camera,
wherein the four rotary wings, the driver, the control signal generation circuit, and the imaging camera are integrated using the frame,
wherein an upper surface of the frame defines four apertures that correspond respectively to the four rotary wings, and each of the four apertures is partly covered by the frame.

2. The unmanned aerial vehicle according to claim 1, further comprising one or more preceding impactors positioned proximate one or more edges of the frame and configured to impact one or more boundary surfaces of the closed-type space before the frame can impact the one or more boundary surfaces of the closed-type space.

3. The unmanned aerial vehicle according to claim 2, wherein a particular preceding impactor is positioned at an edge of the unmanned aerial vehicle that is forward of the center of gravity of the unmanned aerial vehicle.

4. The unmanned aerial vehicle according to claim 1, wherein the control signal includes an attitude control signal, and the unmanned aerial vehicle is configured so that the attitude control signal causes the driver to drive the rotary wings,
and, when the unmanned aerial vehicle is tilted, the attitude of the unmanned aerial vehicle is controlled by reducing the number of rotations of one or some of the rotary wings.

5. The unmanned aerial vehicle according to claim 1, wherein:
the driver includes four motors configured to provide motive power to the four rotary wings, respectively, and
each of the motors is positioned above a corresponding rotary wing so that force generated by rotation of the rotary wing urges the rotary wing towards the motor.

6. The unmanned aerial vehicle according to claim 1, further comprising a direction of travel imaging camera and a direction of travel imaging data transmitter,
wherein the unmanned aerial vehicle is configured to fly inside the closed-type space while capturing images in the direction of travel inside the closed-type space with the direction of travel imaging camera and while transmitting, to the outside, captured direction of travel imaging data from the direction of travel imaging data transmitter.

7. A method that facilitates inspection of a closed-type space, the method comprising:
providing an unmanned aerial vehicle, wherein the unmanned aerial vehicle comprises:

a frame that is elongated in a forward direction of travel from a forward end of the frame to an aft end of the frame;

four rotary wings, wherein a first pair of the four rotary wings is positioned on a front-half side of the frame and a second pair of the four rotary wings is positioned on a back-half side of the frame, and wherein the four rotary wings are positioned inside the frame;

a plurality of rotatable components for preceding impact supported by the frame along an upper surface of the front-half side of the frame;

a driver that drives the four rotary wings;

a control signal generation circuit that is configured to generate a control signal for causing the driver to drive the four rotary wings, wherein the control signal generation circuit is positioned between the first pair of the four rotary wings and the second pair of the four rotary wings; and an imaging camera, wherein the four rotary wings, the driver, the control signal generation circuit, and the imaging camera are integrated using the frame, wherein an upper surface of the frame defines four apertures that correspond respectively to the four rotary wings, and each of the four apertures is partly covered by the frame;

driving the four rotary wings to fly the unmanned aerial vehicle inside the closed-type space; and capturing images inside the closed-type space with the imaging camera.

8. The unmanned aerial vehicle according to claim 1, further comprising a thrust generation propeller inside the frame, and wherein the unmanned aerial vehicle is configured to propel by rotations of the thrust generation propeller while floating by rotations of the four rotary wings.

9. The unmanned aerial vehicle according to claim 1, further comprising a waterproof case, wherein the control signal generation circuit is stored in the waterproof case.

10. The unmanned aerial vehicle according to claim 1, wherein the unmanned aerial vehicle is configured to fly inside a tubular closed-type space extending in a direction other than a vertical direction by driving the four rotary wings and to simultaneously capture images inside the tubular closed-type space with the imaging camera.

11. The method of claim 7, wherein capturing the images inside the closed-type space comprises capturing the images inside a tubular closed-type space that extends in a direction other than a vertical direction.

12. The method of claim 11, wherein capturing the images comprises capturing the images in the direction of travel of the unmanned aerial vehicle inside the tubular closed-type space while the unmanned aerial vehicle flies inside the tubular closed-type space.

13. The method of claim 11, further comprising transmitting the images from inside the tubular closed-type space to outside the tubular closed-type space.

14. The method of claim 7, further comprising a waterproof case, wherein the control signal generation circuit is stored in the waterproof case.

15. The unmanned aerial vehicle according to claim 1, wherein the imaging camera is oriented in the forward direction.

16. The method of claim 7, wherein the imaging camera is oriented in the forward direction.

17. The unmanned aerial vehicle according to claim 1, wherein the imaging camera is positioned at the forward end of the frame.

18. The method of claim 7, wherein the imaging camera is positioned at the forward end of the frame.

19. The unmanned aerial vehicle according to claim 1, wherein the closed-type space is a tubular space in a sewerage pipeline.

20. The method of claim 7, wherein the closed-type space is a tubular space in a sewerage pipeline.

21. An unmanned aerial vehicle comprising:

a frame including a front end having a narrow width and an aft end offset relative to the front end by an overall length that is elongated relative to the front end and in a direction of forward travel, and wherein the narrow width and overall length are sized to operate within an enclosed space;

a plurality of rotatable components for preceding impact supported by the frame along an upper surface of the front-half side of the frame;

a sensor package mount at the front end of the frame, wherein the sensor package is arranged in the direction of forward travel and includes an imaging camera;

a first pair rotary wings mounted adjacent to the front end of the frame, and a second pair of rotary wings mounted adjacent to the aft end of the frame;

a control signal generation circuit mounted between the first pair of rotary wings and the second pair of the four rotary wings, wherein the control signal generation circuit is configured to provide a control signal to instruct a driver in communication with the first pair rotary wings and the second pair rotary wings, wherein the driver drives the first pair rotary wings and the second pair rotary wings; and a first pair of apertures formed into an upper surface of the frame and partially covering the first pair of rotary wings, and a second pair of apertures formed into the upper surface of the frame and partially covering the second pair of rotary wings.

22. The unmanned aerial vehicle according to claim 1, wherein each of the plurality of rotatable components for preceding impact is configured as a wheel.

23. The unmanned aerial vehicle according to claim 1, wherein each of the plurality of rotatable components for preceding impact is fixed to the upper surface and configured as a spherical member.

24. The unmanned aerial vehicle according to claim 1, wherein the frame includes at least one frame member that extends away from the upper surface and is configured to carry at least one of the plurality of rotatable components for preceding impact.

* * * * *